United States Patent Office 3,372,167
Patented Mar. 5, 1968

3,372,167
PREPARATION OF WATER SOLUBLE
SULFUR VAT DYES
Jan Jacobus Anthonius Moll, Vlaardingen, Netherlands, assignor to Fabriek Van Chemische Producten Vondelingen-plaat N.V., Rotterdam, Netherlands, a corporation of Dutch law
No Drawing. Filed Nov. 29, 1963, Ser. No. 327,097
Claims priority, application Netherlands, Nov. 29, 1962, 286,138
10 Claims. (Cl. 260—315)

This invention relates to a process for the preparation of water soluble sulfur vat dyes. More particularly, the invention relates to a novel method of preparing water soluble sulfur vat dyes by the removal of electrolytes and the subsequent contacting of the sulfur vat dyestuff with safts of sulfurous acid.

In the dyestuff art a clear distinction is made between sulfur dyes on one hand and sulfur vat dyes on the other hand. Both types of dyes contain sulfur in the molecule and are obtained by heating suitable starting materials with sulfur, sodium sulfide or sodium polysulfide. The characteristic difference between both groups is found in the use of the dyes. Sulfur dyes are dyed from a sodium sulfide bath. Sulfur vat dyes are preferably employed from an alkaline hydrosulfite solution or with the use of a similar process. Thus, the sulfur dyes are generally restricted to dyes which dissolve in aqueous sodium sulfide thereby forming reduction products with a marked affirmity for cotton. The sulfur dyes are distinguishable from the sulfurized vat dyes (eg. sulfurized indophenols, sulfurized anthracenes, sulfurized diarylaminobenzoquinones) the latter being best applied from an alkaline hydrosulfite solution. Further discussion of the basic distinctions between these two classes of dyes can be found in The Chemistry of Synthetic Dyes, vol. II, by Venkataraman, Academic Press Inc., New York 1952—Chapters XXXV and XXXVI, pages 1059–1118.

It is known to convert sulfur dyes with salts of sulfurous acid to form water soluble sulfur dyes. These water soluble dyes have properties which are very advantageous for dyeing. By their very small affinity to the fibers and the ease with which they can be converted with an alkaline reducing agent again in the leuko form of the original water insoluble dye, they are especially suitable for dyeing piece goods continuously or batchwise on the jig. The obtained dyeing is excellent and the dyeing time is short. Also in machine dyeing the water soluble dyes are very suitable.

Sulfur vat dyes obtained by sulfurizing indophenols derived from carbazole and its substitution products have been reacted with alkalibisulfite to form water insoluble bisulfite compounds, which are not decomposed by a steam treatment and are fixed to give very good grey shades.

Since the recent developments in dyeing technics require the finest possible division of the dyes, the sulfur vat dyes have also been reduced partially and have been divided simultaneously very finely by using dispersion agents to form substantially colloidal solutions of the dyes. The amount of reducing agent is not sufficient therein to dissolve the dyes completely in water. By using this method no water soluble products are obtained therefore.

According to the present invention, there is now provided a new and effective method for the preparation of water soluble sulfur vat dyestuffs. The method of the instant invention has been found applicable to all dyestuffs classified as sulfur vat dyestuffs. Examples of suitable sulfur vat dyestuffs are further found in Chapter XXXVI of The Chemistry of Synthetic Dyestuffs, supra.

It is an object of the invention to provide water soluble sulfur vat dyes. Moreover it is an object of the invention to obtain water soluble sulfur vat dyes having all advantages of the water soluble sulfur dyes. It is a further object to produce water soluble sulfur vat dyes which show excellent thermal stability. Moreover it is an object of the invention to produce water soluble vat dyestuffs in a simple straightforward method. Other objects of the invention will become clear from the following description.

It has been found surprisingly that the objects of the invention can be realized in a very simple way. It has namely been found that the sulfur vat dyes such as those disclosed above can be converted very simply into water soluble dyes, if the sulfur vat dye is treated until the amount of the electrolyte present in the dye has been reduced below a critical limit. This critical limit is dependent on the dyes used and the methods of preparation thereof. Preferably, the lowest possible electrolyte content will be aimed at, e.g. an electrolyte content of less than 1%. Generally, however, a higher electrolyte content is acceptable, e.g. a content of 4–5%. Therefore, the general range of electrolyte concentration after washing will be below 5 percent while preferably the electrolyte content will be below 1 percent. The dyes treated in this way are then converted with salts of sulfurous acid to form water soluble compounds. The resulting dyes show all advantages of the water soluble sulfur dyes. Since no reducing agent is present, they are stable also during a long storage. Furthermore they possess an excellent thermal stability. Finally, they are substantially non-substantive in view of the absence of the reducing agent, which is very advantageous for dyeing continuously.

Any conventional method may be used to reduce the electrolyte content below the required limit. The method by which the electrolyte is removed is not critical and does not constitute per se a novel feature of this invention. A particularily suitable method with respect to time and expense is washing the sulfur vat dyestuff with a suitable washing agent (e.g. water). Other washing agents may be used provided of course they do not dissolve the sulfur vat dyestuff.

As salts of sulfurous acid used to convert the treated sulfur vat dye there may be mentioned both the normal and the acid sulfites. Suitable metals are, for example, the alkali metal sulfites produced by bubbling sulfur dioxide into a solution of the hydroxide of a metal. If the acid salt is to be produced, an excess of sulfur dioxide is passed into the solution.

The following examples will illustrate certain of the numerous specific embodiments of the invention. It will be understood that the examples are presented with the intent of illustrating and not of limiting the invention and that various modifications can be resorted to without departing from the letter and spirit of the invention as defined in the appended claims.

*Example 1*

300 g. of the dye C.I. Vat Blue 43 is washed with water until the electrolyte content is less than 1% and is kneaded thereafter in the form of a paste with a water content of about 40% at about 70° C. with 150 g. of anhydrous sodium sulfite until the desired solubility has been reached.

The resulting product is dried at 60° C. The dye has been brought quantitatively into a water soluble form.

The dye C.I. Vat Blue 43 can be obtained by sulfuration of 3-carbazolyl amino phenol with sodium polysulfite in butanol, heating with sodium nitrite, distillation of the butanol and precipitation of the dye by introduction of air.

*Example 2*

25 kg. of a paste of the dye C.I. Sulphur Black 11 having a water content of 50% by weight and an electrolyte content of 1.75% are thoroughly mixed with 9.4 kg. of anhydrous sodium sulfite. Under vigorous agitation the mixture is heated at 80° C., whereafter the mass is evaporated to form a thick paste. Subsequently, this paste is dried. The resulting dye is water soluble.

The dye C.I. Sulphur Black 11 can be obtained by sulfurizing p-2-naphthylamino phenol in butanol, oxidation with sodium nitrite in situ, distillation of butanol with steam, filtration of the raw dye and conversion with diluted hydrochloric acid.

*Example 3*

400 g. of the dye C.I. Vat Blue 42 are washed with water to a final electrolyte content of 0.75% and thereafter kneaded during 5 hours at a temperature of 65° C. with 200 g. of anhydrous sodium sulfite. The resulting product is dried at 60° C. and quantitatively water soluble.

The dye used can be obtained from p-(9-ethyl-3-carbazolylamino) phenol in the same way as the dye of Example 1 has been obtained.

*Example 4*

The dye obtained by butanolic sulfuration of a mixture of p - 2 - naphthylaminophenol, p - 3 (3 - carbazolylamino) phenol and p-nitrophenol in a ratio of 8:2:1 is washed to reduce the electrolyte content to a value of 1.5%. A portion of this dye is mixed with half of its weight (based on the dry dye) of anhydrous sodium sulfite. After working up the resulting mass in the usual way a water soluble product is obtained.

What I claim is:

1. A process for the preparation of water soluble sulfur vat dyes which comprises treating the sulfur vat dye to remove electrolytes until the amount of electrolytes present in the dye is reduced below about 5 percent by weight and converting the treated sulfur vat dye to the water soluble form by contacting with a salt of sulfurous acid.

2. A process according to claim 1 wherein the electrolyte content is reduced below about 1 percent by weight.

3. A process according to claim 1 wherein the removal of the electrolytes is affected by washing the sulfur vat dye with water.

4. A process according to claim 1 wherein the salt of sulfurous acid is an alkali metal sulfite.

5. A process for the preparation of water soluble sulfur vat dyestuffs which comprises treating the sulfur vat dye to remove electrolytes by washing with water until the amount of electrolytes present in the dye is reduced below about 5 percent by weight and converting the treated sulfur vat dye by contacting with an alkali metal salt of sulfurous acid.

6. A process according to claim 5 wherein the electrolyte content is reduced to below about 1 percent by weight.

7. A process according to claim 5 wherein the alkali metal salt of sulfurous acid is sodium sulfite.

8. A water soluble sulfur vat dyestuff produced by a method comprising treating the sulfur vat dye to remove electrolytes by washing with water until the amount of electrolytes present in the dye is reduced below about 5 percent by weight and converting the treated sulfur vat dye by contacting with an alkali metal salt of sulfurous acid.

9. A dyestuff according to claim 8 wherein the electrolyte content is reduced to below about 1 percent by weight.

10. A dyestuff according to claim 8 wherein the alkali metal salt of sulfurous acid is sodium sulfite.

References Cited

UNITED STATES PATENTS

| 1,885,037 | 10/1952 | Muth | 260—317 |
| 3,088,790 | 5/1963 | Schultheis et al. | 8—54.2 |
| 3,249,394 | 5/1966 | Staeuble et al. | 8—34 |

OTHER REFERENCES

Vickerstaff: "The Physical Chemistry of Dyeing," Interscience Pub. Inc., New York (1954), pp. 18–19 and 23.

Venkataram: "The Chemistry of Synthetic Dyes," vol. II, Academic Press Inc., Pub., New York (1952), pp. 1046–9 and pp. 1101–5.

JOHN D. RANDOLPH, *Primary Examiner.*

J. M. FORD, *Assistant Examiner.*